No. 858,652. PATENTED JULY 2, 1907.
L. HARRISON.
SAW.
APPLICATION FILED APR. 2, 1906.

Witnesses
Inventor
Leonard Harrison
by
Foster, Freeman & Watson
Attorneys

UNITED STATES PATENT OFFICE.

LEONARD HARRISON, OF WELLSBORO, PENNSYLVANIA.

SAW.

No. 858,652.　　　Specification of Letters Patent.　　　Patented July 2, 1907.

Application filed April 2, 1906. Serial No. 309,460.

*To all whom it may concern:*

Be it known that I, LEONARD HARRISON, a citizen of the United States, residing at Wellsboro, Tioga county, State of Pennsylvania, have invented certain new and useful Improvements in Saws, of which the following is a specification.

My invention relates to saws and consists of a saw having teeth shaped and beveled so as to overcome defects of ordinary constructions, as fully set forth hereinafter and as illustrated in the accompanying drawing in which:—

Figure 1:
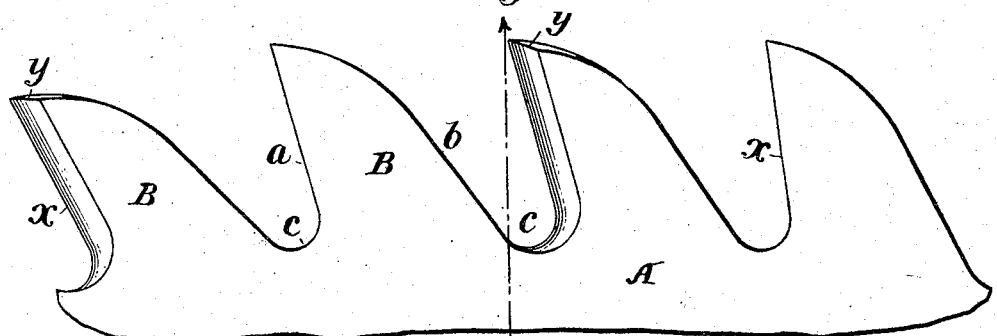
Figure 3:
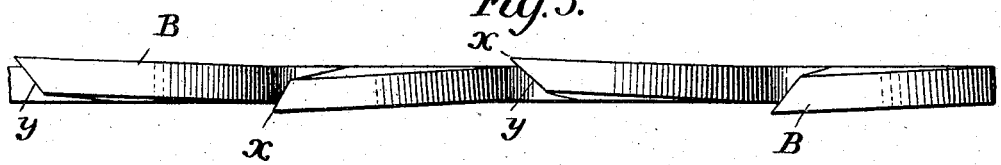
Figure 2:
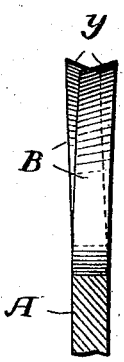
Figure 4:
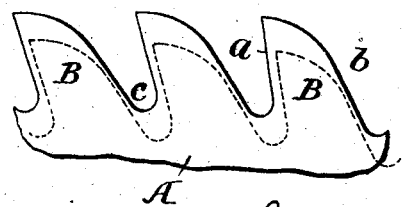

Figure 1 is a side view of sufficient of a saw to illustrate my improvement; Fig. 2 is a view looking in the direction of the arrow, Fig. 1; Fig. 3 an edge or plan view of Fig. 1; Fig. 4 a view illustrating the effect of sharpening the teeth.

The saw blade A may be either circular or straight, and is provided with a series of teeth B having straight fronts $a$ which are inclined forward as in Fig. 1.

The back $b$ of each tooth extends from the front in a curve downward to a recess $c$ so that the tooth gradually widens toward the base. The teeth are alternately set to opposite sides as usual, and the fronts of the teeth are beveled in opposite directions, the outer edge $x$ being forward, and the back of each tooth as it approaches the cutting edge $x$ is inclined laterally, (Fig. 2) so as to terminate in an inclined edge $y$, the highest end of which is at the point where it meets the edge $x$.

Saws with teeth of the ordinary construction have well known defects which to some extent are obviated by the constructions having "pillar teeth" in which the fronts of the teeth are straight and beveled, and the backs substantially parallel thereto, but with such teeth it is impossible to shape them by the usual emery wheel sharpeners, so that hand filing is necessary. This compels the use of softer plates than can be employed when the teeth are shaped by machinery, and the saws are therefore not so durable. Further, with such teeth each sharpening operation reduces the width of the teeth, the dimensions of which are not preserved, so that after a comparatively few sharpening operations the teeth are so reduced that the saw must be discarded. By forming the teeth as above shown and described I avoid these difficulties, while preserving the advantages of straight beveled fronts.

Thus with the construction shown the usual emery wheel sharpeners may be employed, hard plates may be used, and the sharpening operations do not alter the form or materially change the sizes of the teeth. As shown in Fig. 4, the cutting of the teeth back to the dotted line is effected without change of shape or size. Further, the teeth are better supported at the base as the back of each tooth at its base closely approaches the front of the next tooth.

The forward inclination of the fronts of the teeth as shown in Fig. 1 and 4 is of material advantage in insuring a clean cut and disposing of the cuttings.

I claim:

A cross-cut saw consisting of a blade with a series of teeth alternately set to opposite sides and having straight fronts inclined forward and curved backs and widening toward the base, the fronts of alternate teeth beveled in opposite directions with the forward edge of each tooth at the side to which the tooth is set, and the extension of the back forming the end of each tooth slightly inclined inward at and adjacent to the cutting edge.

In testimony whereof I affix my signature in presence of two witnesses.

LEONARD HARRISON.

Witnesses:
　H. B. PACKER,
　W. D. VAN HORN.